D. E. ROE.
Fly-Trap.
No. 161,354.  Patented March 30, 1875.
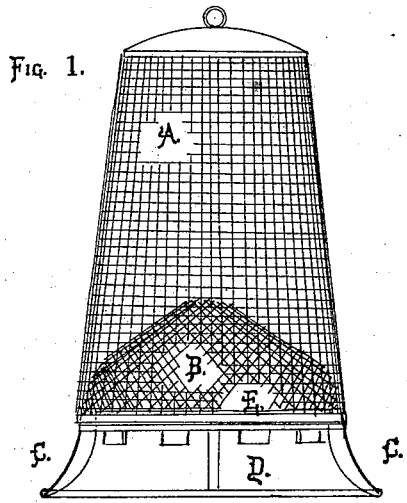
Fig. 1.
Fig. 3.
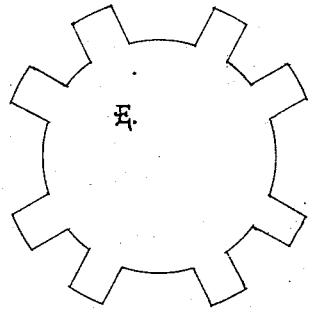
Fig. 2.
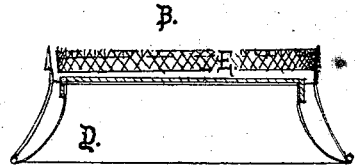
Witnesses
Inventor.
D. E. Roe
BY J. G. Arnold
ATTY.

UNITED STATES PATENT OFFICE.

DAVID E. ROE, OF AYER, MASSACHUSETTS.

IMPROVEMENT IN FLY-TRAPS.

Specification forming part of Letters Patent No. 161,354, dated March 30, 1875; application filed July 16, 1874.

*To all whom it may concern:*

Be it known that I, DAVID E. ROE, of Ayer, in the county of Middlesex, State of Massachusetts, have invented certain Improvements in Fly-Traps, of which the following is a specification:

My invention relates to that class of wire-cloth traps in which a cone and receiver are used over the bait, the latter retaining the flies until they are removed therefrom. It is designed to allure or attract the flies, and to lead or tole them into the cone-shaped receptacle, from whence, when sated, they will pass into the receiver, which is still more difficult to escape from—or, in other words, into the trap—and to obviate the necessity of a pan or cup to hold the bait or attraction.

In the accompanying drawings, Figure 1 is a side view of a trap embodying my invention. Fig. 2 is a central vertical section of the lower parts of the same, and Fig. 3 shows the removable mat and its leaders.

The same parts are indicated by the same letters wherever they occur.

D is the base or bottom, made with a flat top and sloping sides, with the lower edge turned over to form a catch to receive and retain the ends of the legs C C, and yet allow them to be removed by springing them slightly together. These legs are attached to and support the cone B, which is made enough larger than the top of the base D (over which it is held by the legs C C) to leave room for the flies to pass between them all round. The cone B has a small hole or holes in its top, through which the flies can pass into the receiver A above. E is the removable mat, made of any retentive substance, as cloth or paper, to retain the bait or attraction, such as sweetened water, molasses, or sugar, or anything attractive to the flies, and lying on the top of D, with its leaders or projecting portions lying on the sides, between the base D and the rim of the cone B, and slightly projecting beyond the latter, so as to present some of the bait openly to the sight and smell of the flies, and also to allure them into the cone B, giving them foot-hold, or something to walk on without their having to wade through the bait; and when necessary to remove the mat, either to renew the bait or to remove any that may have become offensive, it can be done by springing one of the legs C slightly. It will slip out of the turned edge of the base, and allow the cone B and the mat E to be removed. The legs C C both retain and support the cone B on the base D, and the cone B, in its turn, supports and retains the receiver A, which is made to fit onto B just above its rim, in order to allow it to open there to remove the dead flies, which would otherwise wedge into the space between them, from which place it is so difficult to remove them in the old forms of construction, the receiver A in mine being closed entirely, except where it lifts off from the cone B. By making the legs C C a little longer the lower edge of B may be left a little above the top of the base D, and the edge of the mat be exposed without the projections shown in Fig. 3; but I judge it would be easier for the flies to escape, and therefore prefer the form shown, and other variations may be made without departing from the principles of my invention, the peculiarities of which are plainly shown in its operation, which is as follows: The mat E being wet in all parts with any fluid attractive to the flies, and laid on D, with its leaders lying down on its sides, the cone B is placed over it, leaving their slightly-projecting ends in sight, and the receiver A is placed on the cone B. The open nature of the wire-cloth of the cone and receiver allows the aroma of the bait on the mat to pass through them in some degree, though necessarily more diffused and less strong than that direct from the exposed edges of the mat E, and as the insect comes near it is attracted by the stronger, and finds free access, whether on the wing, or having alighted on the table, or whatever the trap is standing on. They are thus allured direct to the bait on the mat E, and, finding good foot-hold they pass into the cone without having to wade, as in traps as heretofore made with a pan or cup to hold the bait, and others coming crowd those that have alighted, who, following the mat and bait, are decoyed into the cone B, and after eating their fill, or when sated, the light seen through the wire-cloth above them suggests that as the way of escape, and, passing up the cone B, they come out of the hole or holes at its top into the receiver A, seldom or never going out the way they got in. This part of the operation is not new, but is similar to other traps already known.

Having caught the flies in the receiver, it is necessary to have some way to remove them, which has heretofore been accomplished by having the top of the receiver to open, and such as may fall between the cone and receiver are with difficulty poked out with a sharp stick or wire, while in mine, by having the receiver open at its junction with the cone, and lift off there, all the flies can be removed with facility.

This manner of constructing and putting together the trap presents marked advantages for packing for transportation, as the boxes, cones, and receivers may be separately nested, and the mats packed flat, and a large number be packed in a small space, while they are all ready to be put together when unpacked.

What I claim as new, and desire to secure by Letters Patent, is—

1. In combination with a trap for flies, the mat E, having a radially-extending edge, upon which part of the bait is placed as a decoy.

2. The base D, cone B, with receiver A opening therefrom, and the mat E, having a projecting edge, in combination, as and for the purposes above set forth.

DAVID E. ROE.

Witnesses:
  LEVI SHERWIN,
  CHARLES SHERWIN.